(12) United States Patent
Young

(10) Patent No.: US 8,566,706 B2
(45) Date of Patent: Oct. 22, 2013

(54) USER-FRIENDLY DISPLAY OF DATA

(75) Inventor: Stephen Robert Young, Kanagawa (JP)

(73) Assignee: Sony Corporation (JP)

( * ) Notice: Subject to any disclaimer, the term of this patent is extended or adjusted under 35 U.S.C. 154(b) by 832 days.

(21) Appl. No.: 12/157,393

(22) Filed: Jun. 10, 2008

(65) Prior Publication Data

US 2008/0306993 A1   Dec. 11, 2008

(30) Foreign Application Priority Data

Jun. 11, 2007   (JP) ................................ P2007-153960

(51) Int. Cl.
*G06F 7/00* (2006.01)

(52) U.S. Cl.
USPC ........... 715/246; 715/253; 715/277; 715/781; 715/784

(58) Field of Classification Search
None
See application file for complete search history.

(56) References Cited

U.S. PATENT DOCUMENTS

| | | | |
|---|---|---|---|
| 7,437,005 B2 * | 10/2008 | Drucker et al. ............... | 382/224 |
| 7,543,246 B2 * | 6/2009 | Mifune ......................... | 715/838 |
| 2001/0043727 A1 * | 11/2001 | Cooper ........................ | 382/118 |
| 2003/0033296 A1 * | 2/2003 | Rothmuller et al. ............. | 707/3 |
| 2003/0156138 A1 | 8/2003 | Vronay et al. | |
| 2004/0176140 A1 * | 9/2004 | Nishino et al. ................ | 455/566 |
| 2004/0201752 A1 * | 10/2004 | Parulski et al. .......... | 348/231.99 |
| 2004/0208377 A1 * | 10/2004 | Loui et al. .................... | 382/224 |
| 2005/0050043 A1 * | 3/2005 | Pyhalammi et al. ............ | 707/6 |
| 2005/0166149 A1 | 7/2005 | Frigon et al. | |
| 2005/0192924 A1 | 9/2005 | Drucker et al. | |
| 2006/0224993 A1 * | 10/2006 | Wong et al. ................... | 715/800 |
| 2007/0024722 A1 * | 2/2007 | Eura et al. ................. | 348/231.2 |
| 2007/0174790 A1 * | 7/2007 | Jing et al. .................... | 715/838 |
| 2010/0095238 A1 * | 4/2010 | Baudet ......................... | 715/784 |

FOREIGN PATENT DOCUMENTS

| | | |
|---|---|---|
| EP | 1 338 960 A2 | 8/2003 |
| EP | 1 566 752 A2 | 8/2005 |
| JP | 11-328209 A | 11/1999 |
| JP | 2005-107723 A | 4/2005 |
| JP | 2007-065790 A | 3/2007 |

* cited by examiner

*Primary Examiner* — Stephen Hong
*Assistant Examiner* — Keith Bloomquist
(74) *Attorney, Agent, or Firm* — Lerner, David, Littenberg, Krumholz & Mentlik, LLP

(57) ABSTRACT

A display apparatus for displaying accumulated data items includes obtaining means for obtaining a plurality of data items accumulated, classifying means for classifying the plurality of data items into N groups on the basis of predetermined criteria, display-control means for controlling an indication on a display unit such that the plurality of data are displayed in N display regions corresponding to the N groups, and accepting means for accepting a specification of one display region from among the N display regions. When the accepting means accepts a specification of one display region from among the N display regions, the classifying means classifies a plurality of data items displayed in the specified display region into a further N groups, and the display-control means controls an indication on the display unit such that the plurality of data items are displayed in the N display regions corresponding to the N groups.

8 Claims, 11 Drawing Sheets

USER-FRIENDLY DISPLAY OF DATA

CROSS-REFERENCE TO RELATED APPLICATIONS

The present application claims priority from Japanese Patent Application No. JP 2007-153960, filed in the Japanese Patent Office on Jun. 11, 2007, the entire content of which is incorporated herein by reference.

BACKGROUND OF THE INVENTION

1. Field of the Invention

The present invention relates to a display apparatus, a display method, a program, and a recording medium, and, in particular, to a display apparatus, a display method, a program, and a recording medium with which desired data can be easily obtained.

2. Description of the Related Art

Recently, with the wide use of digital still cameras or the like, for example, it has been easy to save shot images as data items. Accordingly, users save a large number of shot images in personal computers or the like, and, for example, the users often enjoy displaying the images on displays.

Additionally, recently, the wide use of search engines has been remarkable. For example, a search engine has been developed, which searches image data items or the like using a natural language. Another search engine has also been developed, which searches data items of images that are similar to an input image (for example, see United States Patent Application Publication No. 20050166149).

Such search engines, for example, search data items of images that are most similar to an input image from among images accumulated in advance to obtain searched image data items, and display the searched image data items.

SUMMARY OF THE INVENTION

However, recently, storage capacities of computers or the like have been rapidly increased, resulting in the enormous amounts of accumulated data items.

For this reason, for example, it has been difficult for a user to search a desired image in accumulated image data items. In order to search a desired image from among a large number of images, for example, it is possible to search a desired data item with reference to metadata items showing the shooting dates of images or the like. However, in most cases, the user does not accurately remember the shooting date of the desired image. It is necessary for the user to have a task of searching the desired image while checking a number of images.

Additionally, also in a case where the desired image is to be searched by a search engine or the like, the probability that the desired image is exactly obtained as a search result in one search is low. In normal cases, a plurality of search results are displayed. It is difficult to find the desired image from among a large number of images displayed as the search results.

Furthermore, when a large number of images are displayed as the search results, it is possible to obtain the desired image, for example, by performing a search after further narrowing down the search results. In such a case, it is necessary for the user who performs the search, for example, to carefully select a keyword, an image, or the like that the user inputs into the search engine. Accordingly, a lot of time is necessary to obtain the desired image.

In view of the above-described circumstances, it is desirable to easily obtain desired data.

According to a first embodiment of the present invention, there is provided a display apparatus for displaying accumulated data items on a display unit. The display apparatus includes the followings: obtaining means for obtaining a plurality of data items that are accumulated; classifying means for classifying the plurality of data items that are obtained by the obtaining means into N groups on the basis of predetermined criteria; display-control means for controlling an indication on the display unit such that the plurality of data items that are classified by the classifying means are displayed in N display regions corresponding to the N groups; and accepting means for accepting a specification of one display region from among the N display regions. When the accepting means accepts a specification of one display region from among the N display regions, the classifying means classifies a plurality of data items displayed in the specified display region into a further N groups, and the display-control means controls an indication on the display unit such that the plurality of data items that are further classified by the classifying means are newly displayed in the N display regions corresponding to the N groups.

In each of the N display regions, a predetermined number of data items from among data items that are classified into a group corresponding to the display region may be displayed.

The classifying means may generate information showing a distribution of the plurality of data items on the basis of additional data items that are attached in advance to the plurality of data items obtained by the obtaining means, and calculate distances between the plurality of data items in the distribution to classify the plurality of data items into the N groups.

The classifying means may generate information showing a distribution of the plurality of data items on the basis of evaluation values on the plurality of data items, the evaluation values being calculated by another apparatus, and calculate distances between the plurality of data items in the distribution to classify the plurality of data items into the N groups.

On a screen of the display unit on which the indication is controlled by the display-control means, each of the N display regions may have a predetermined size and be provided at a predetermined position.

On a screen on which the indication is controlled by the display-control means, the N display regions may be set in correspondence with the plurality of data items.

According to a second embodiment of the present invention, there is provided a display method for a display apparatus that displays accumulated data items on a display unit. The display method includes the followings: obtaining a plurality of data items that are accumulated; classifying the plurality of data items that are obtained into N groups on the basis of predetermined criteria; controlling an indication on the display unit such that the plurality of data items that are classified are displayed in N display regions corresponding to the N groups; classifying, in a case in which a specification of one display region from among the N display regions is accepted, a plurality of data items displayed in the specified display region into a further N groups; and controlling an indication on the display unit such that the plurality of data items that are further classified are newly displayed in the N display regions corresponding to the N groups.

According to a third embodiment of the present invention, there is provided a program for causing a computer to perform a process of displaying accumulated data items on a display unit. The program causes the computer to function as a display apparatus for displaying accumulated data items on the display unit. The display apparatus includes obtaining means for obtaining a plurality of data items that are accumulated, classifying means for classifying the plurality of data items that are obtained by the obtaining means into N groups on the basis of predetermined criteria, display-control means for controlling an indication on the display unit such that the plurality of data items that are classified by the classifying means are displayed in N display regions corresponding to the N groups, and accepting means for accepting a specification of one display region from among the N display regions. The program causes the computer to function as follows: when the accepting means accepts a specification of one display region from among the N display regions, the classifying means classifies a plurality of data items displayed in the specified display region into a further N groups, and the display-control means controls an indication on the display unit such that the plurality of data items that are further classified by the classifying means are newly displayed in the N display regions corresponding to the N groups.

In an embodiment of the present invention, the plurality of data items that are accumulated are obtained. The plurality of data items that are obtained are classified into N groups on the basis of predetermined criteria. An indication on the display unit is controlled such that the plurality of data items that are classified are displayed in N display regions corresponding to the N groups. When a specification of one display region from among the N display regions is accepted, a plurality of data items displayed in the specified display region are classified into a further N groups, and an indication on the display unit is controlled such that the plurality of data items that are further classified are newly displayed in the N display regions corresponding to the N groups.

According to the embodiments of the present invention, desired data can be easily obtained.

DESCRIPTION OF THE PREFERRED EMBODIMENTS

Figure 1:
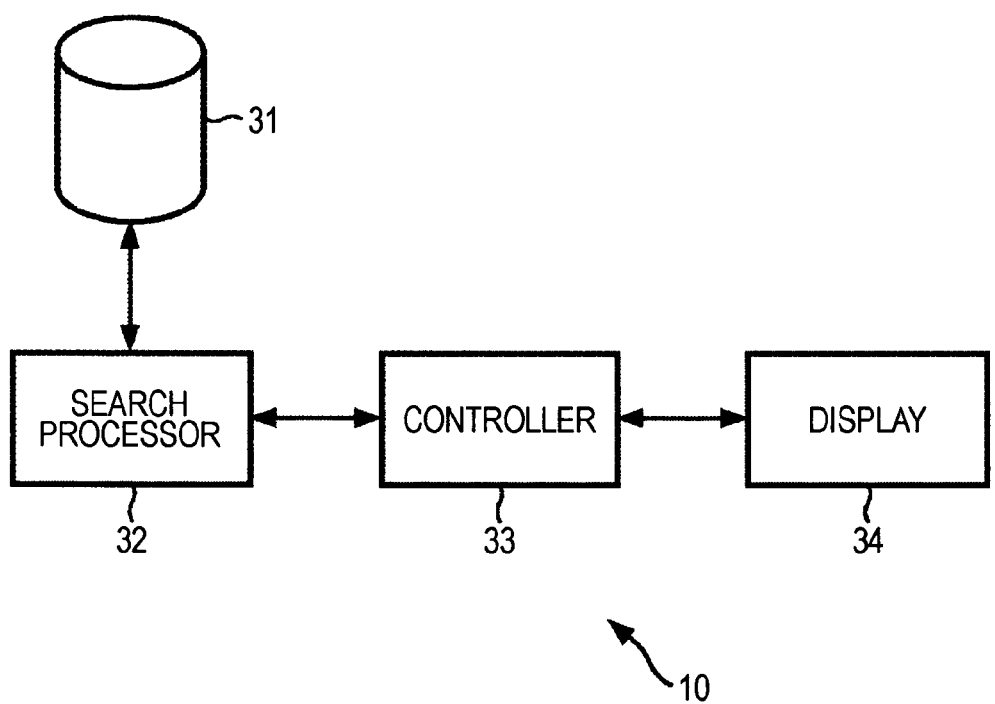
FIG. 1 is a block diagram of an example of a configuration of a search system according to an embodiment of the present invention.

Before describing embodiments of the present invention, examples of correspondence between the features of the present invention and embodiments described in the specification and shown in the drawings will be described below. This description is intended to assure that embodiments supporting the present invention are described in this specification. Thus, even if a certain embodiment, which is described in the specification and shown in the drawings, is not described herein as corresponding to certain features of the present invention, that does not necessarily mean that the embodiment does not correspond to those features. Conversely, even if an embodiment is described herein as corresponding to certain features, that does not necessarily mean that the embodiment does not correspond to other features.

Figure 10:
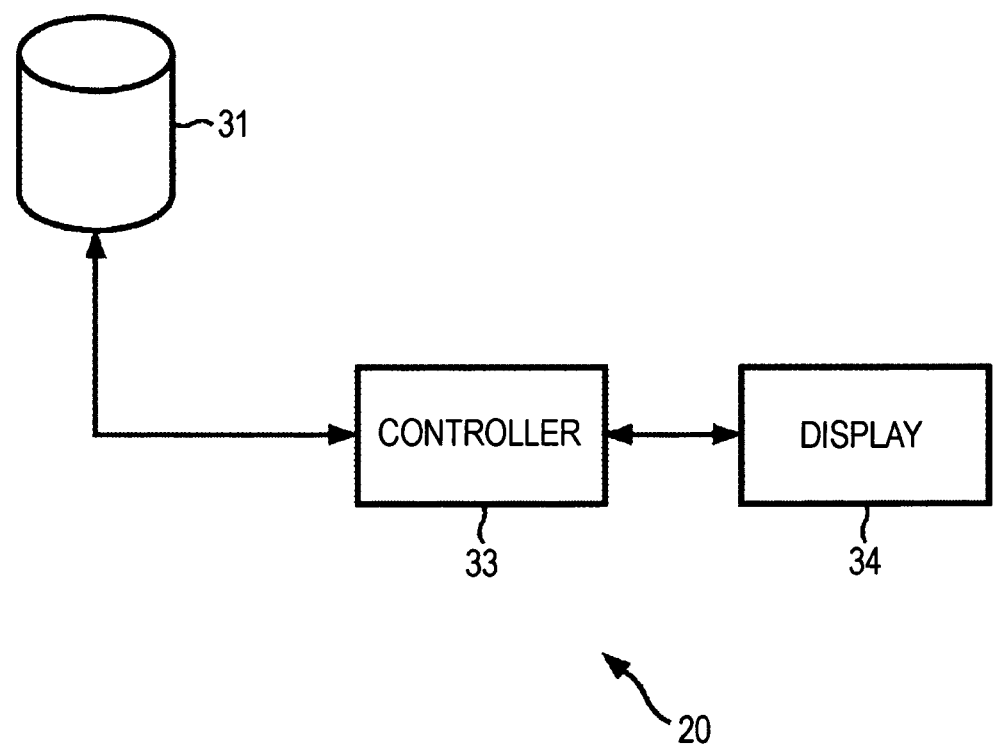
FIG. 10 is a block diagram of an example of a configuration of a display system according to an embodiment of the present invention.

A display apparatus according to an embodiment of the present invention is a display apparatus for displaying accumulated data items on a display unit (for example, a display 34 shown in FIG. 10). The display apparatus includes the followings: obtaining means (for example, a search-result-obtaining section 101 shown in FIG. 2) for obtaining a plurality of data items that are accumulated; classifying means (for example, a search-result-analyzer section 102 and a classification-data-generating section 103 shown in FIG. 2) for classifying the plurality of data items that are obtained by the obtaining means into N groups on the basis of predetermined criteria; display-control means (for example, a display-data-generating section 104 shown in FIG. 2) for controlling an indication on the display unit such that the plurality of data items that are classified by the classifying means are displayed in N display regions corresponding to the N groups; and accepting means (for example, an operation-input-accepting section 105 shown in FIG. 2) for accepting a specification of one display region from among the N display regions. When the accepting means accepts a specification of one display region from among the N display regions, the classifying means classifies a plurality of data items displayed in the specified display region into a further N groups, and the display-control means controls an indication on the display unit such that the plurality of data items that are further classified by the classifying means are newly displayed in the N display regions corresponding to the N groups.

On a screen of the display unit on which the indication is controlled by the display-control means, each of the N display regions (for example, regions 221 to 224 shown in FIG. 4) can have a predetermined size and can be provided at a predetermined position.

Figure 8:
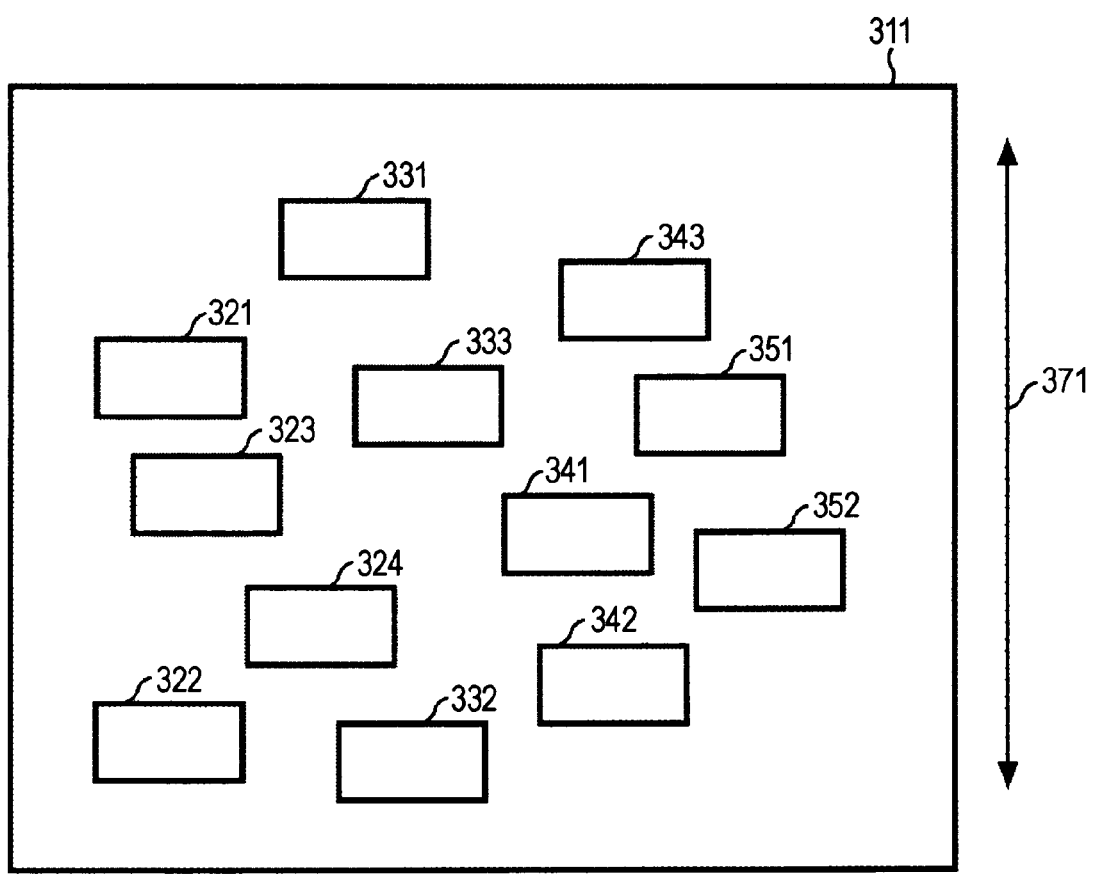
FIG. 8 is an illustration of another example of the display screen on which search results are displayed.
Figure 9:
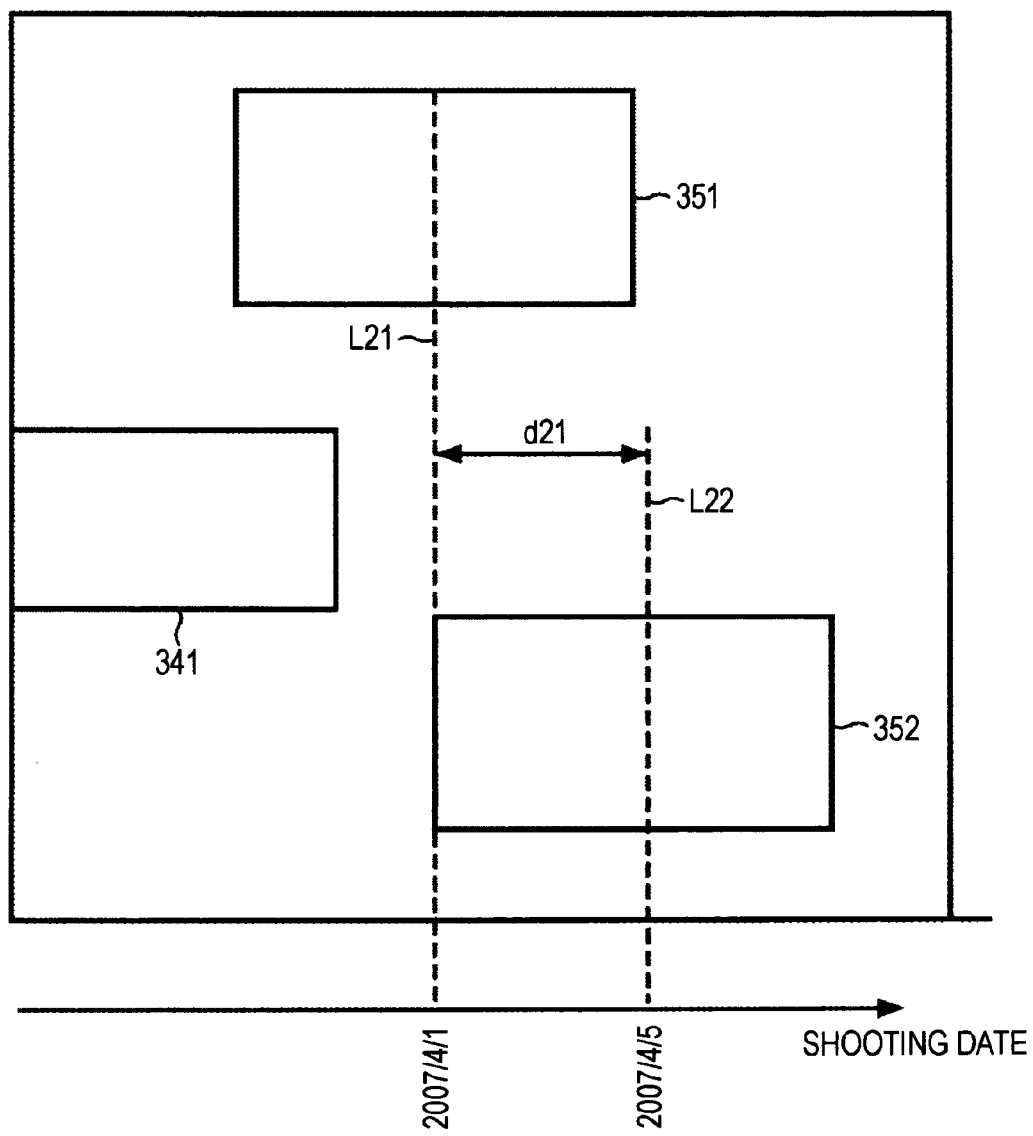
FIG. 9 is an enlarged illustration of a portion of FIG. 8.

On a screen on which the indication is controlled by the display-control means, each of the N display regions can be in correspondence with the plurality of data items (for example, set as shown in FIGS. 8 and 9).

A display method according to an embodiment of the present invention is a display method for a display apparatus that displays accumulated data items on a display unit (for example, the display 34 shown in FIG. 10). The display method includes the followings: obtaining (for example, a process of step S101 shown in FIG. 6) a plurality of data items that are accumulated; classifying (for example, processes of steps S103 to S107 shown in FIG. 6) the plurality of data items that are obtained into N groups on the basis of predetermined criteria; controlling (for example, a process of step S108 shown in FIG. 6) an indication on the display unit such that the plurality of data items that are classified are displayed in N display regions corresponding to the N groups; classifying (for example, a process of step S110 and the processes of steps S103 to S107 shown in FIG. 6), in a case in which a specification of one display region from among the N display regions is accepted, a plurality of data items displayed in the specified display region into a further N groups; and controlling an indication on the display unit such that the plurality of data items that are further classified are newly displayed in the N display regions corresponding to the N groups.

Embodiments of the present invention will be described below with reference to the accompanying drawings.

FIG. 1 is a block diagram of an example of a configuration of a search system according to an embodiment of the present invention.

A search system 10 includes a database 31, a search processor 32, a controller 33, and the display 34.

In the database 31, a plurality of data items, such as image data items, are accumulated. The database 31 may be configured using, for example, a hard disk drive (HDD) or the like. The database 31 may also be configured using a drive in which a predetermined recording medium, such as a digital versatile disc (DVD) or a semiconductor memory card, is mounted.

Not only may the database 31 be configured as one unit, but also the database 31 may include, for example, a plurality of servers that are connected to the Internet.

The search processor 32 searches data items that match a predetermined condition from among the data items accumulated in the database 31, and outputs the matching data items as search results. The search processor 32 is configured, for example, as a so-called search engine. The search processor 32 searches data items corresponding to a keyword, image data, or the like that is input via the controller 33 from among the data items accumulated in the database 31.

The search processor 32, for example, calculates feature quantities of image data items accumulated in the database 31. The search processor 32 compares the calculated feature quantities with a keyword that has been input or a feature quantity of an image data item that has been input on the basis of predetermined criteria to calculate an evaluation value for each of the image data items. For example, image data items having evaluation values higher than a predetermined threshold are output as results of the calculation.

Alternatively, the search processor 32, for example, checks information items that are attached to the image data items accumulated in the database 31, and extracts and outputs image data items that match an input condition, such as a shooting date on which an image was shot.

The controller 33 is a function block that provides overall control of the search system 10. For example, the controller 33 includes an operation unit having a keyboard, a mouse, and so forth, and accepts an operation input provided by a user.

For example, when an instruction for the execution of a search is provided by a user operation, the controller 33 supplies a keyword, an image data item, or the like, which is input by the user, to the search processor 32, and controls the search processor 32 so that the search processor 32 can perform the search. Additionally, for example, when search results are output from the search processor 32, the controller 33 generates display data that is used to display the search results on the display 34. For example, when a user operation is performed on the basis of a screen displayed on the display 34, the controller 33 further generates display data that is used to change a manner in which the search results are displayed to display another screen on the display 34.

The display 34 is a display configured, for example, using a liquid crystal display (LCD) or the like. The display 34 displays a screen, which is provided for the user, on the basis of display data that is supplied from the controller 33.

In the search system 10, a portion of or all of the devices from the database 31 to the display 34 may be configured as one device.

Figure 2:
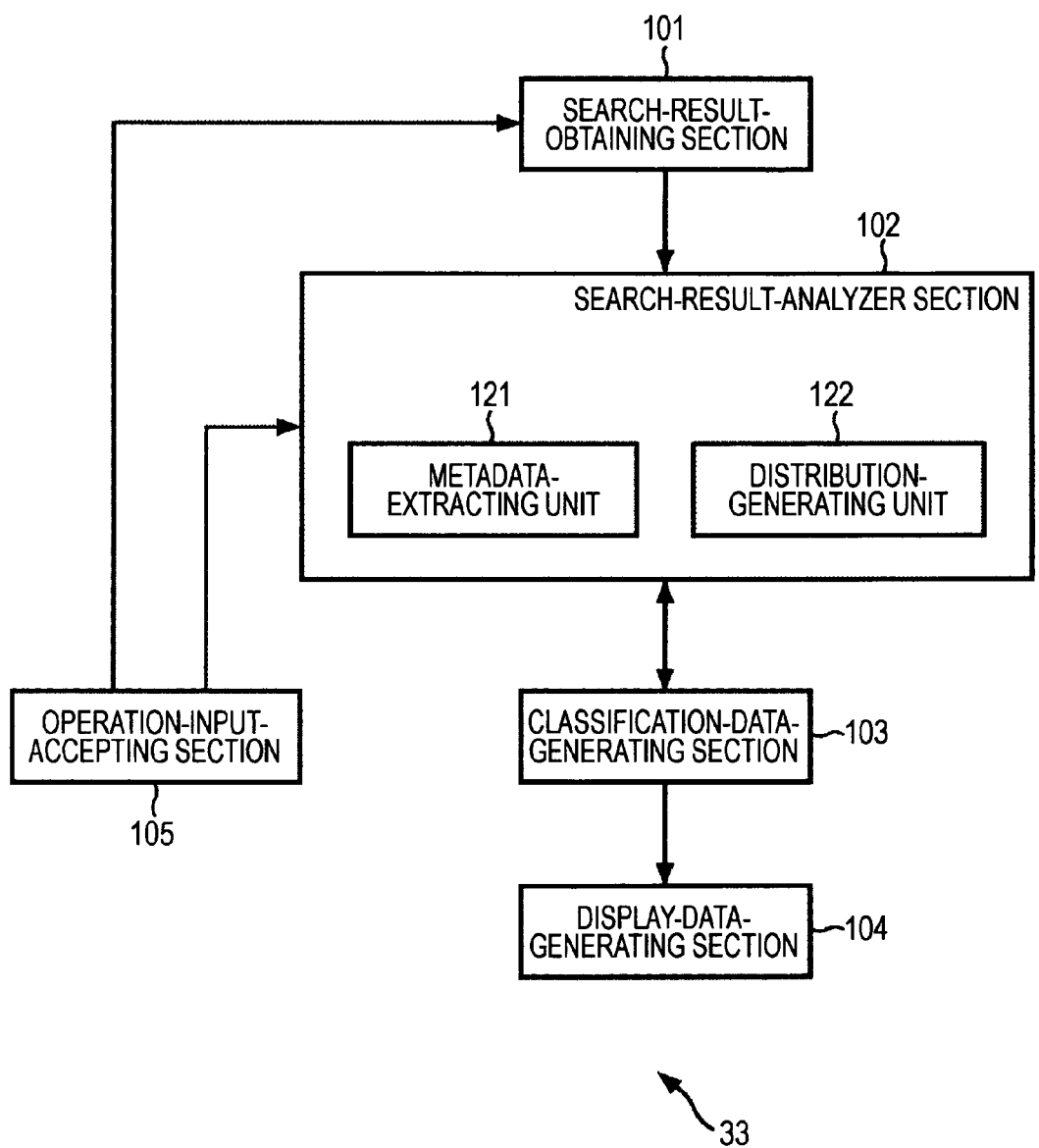
FIG. 2 is a block diagram of an example of a functional configuration of a controller shown in FIG. 1.

FIG. 2 is a block diagram of an example of a functional configuration of the controller 33 shown in FIG. 1.

Referring to FIG. 2, the search-result-obtaining section 101 controls the search processor 32 so that the search processor 32 can search through the data items accumulated in the database 31 on the basis of information items supplied from the operation-input-accepting section 105. As a result, the search-result-obtaining section 101 obtains search results.

The search-result-analyzer section 102 analyzes information items concerning the search results supplied from the search-result-obtaining section 101.

For example, when the search processor 32 searches image data items, a metadata-extracting unit 121 of the search-result-analyzer section 102 extracts information items (for example, dates and times when images were shot) attached to image data items that have been supplied from the search-result-obtaining section 101 as search results, or information items showing examination values, which have been calculated by the search processor 32, as metadata items. Even when a plurality of information items are attached to one image, the plurality of information items are compiled into one metadata item, and the one metadata item is extracted in correspondence with the one image.

A distribution-generating unit 122 of the search-result-analyzer section 102, for example, digitizes and normalizes the metadata items, which have been extracted by the metadata-extracting unit 121, to obtain normalized numerical values, and generates a distribution of the normalized numerical values. Accordingly, for example, each of the metadata items that are digitized is plotted as a corresponding one of the numerical values to generate distribution information.

The classification-data-generating section 103 classifies the search results on the basis of the distribution information, which has been generated by the search-result-analyzer section 102. The classification-data-generating section 103, for example, calculates distances between adjacent metadata items in the distribution information, which has been generated by the search-result-analyzer section 102. When the distances between adjacent metadata items are short, the adjacent metadata items are classified into the same group. When the distances between adjacent metadata items are long, the adjacent metadata items are classified into different groups. As described above, the classification-data-generating section 103 classifies the metadata items, for example, into four groups. Image data items corresponding to the metadata items classified into classification groups are output to the display-data-generating section 104.

The image data items that have been classified into the four groups are supplied from the classification-data-generating section 103 to the display-data-generating section 104. The display-data-generating section 104 generates display data used to display the image data items such that the image data items can be displayed in predetermined regions on the screen of the display 34 on a group-by-group basis.

For example, suppose that information items showing the shooting dates of images are attached as metadata items to data items of the images that have been searched by the search processor 32. In such a case, the metadata-extracting unit 121 of the search-result-analyzer section 102 extracts information items, for example, one of which is "2007/4/1 (showing that an image was shot on Apr. 1, 2007 A.D.)", as the metadata items. Then, the distribution-generating unit 122 generates distribution information shown in FIG. 3.

Figure 3:
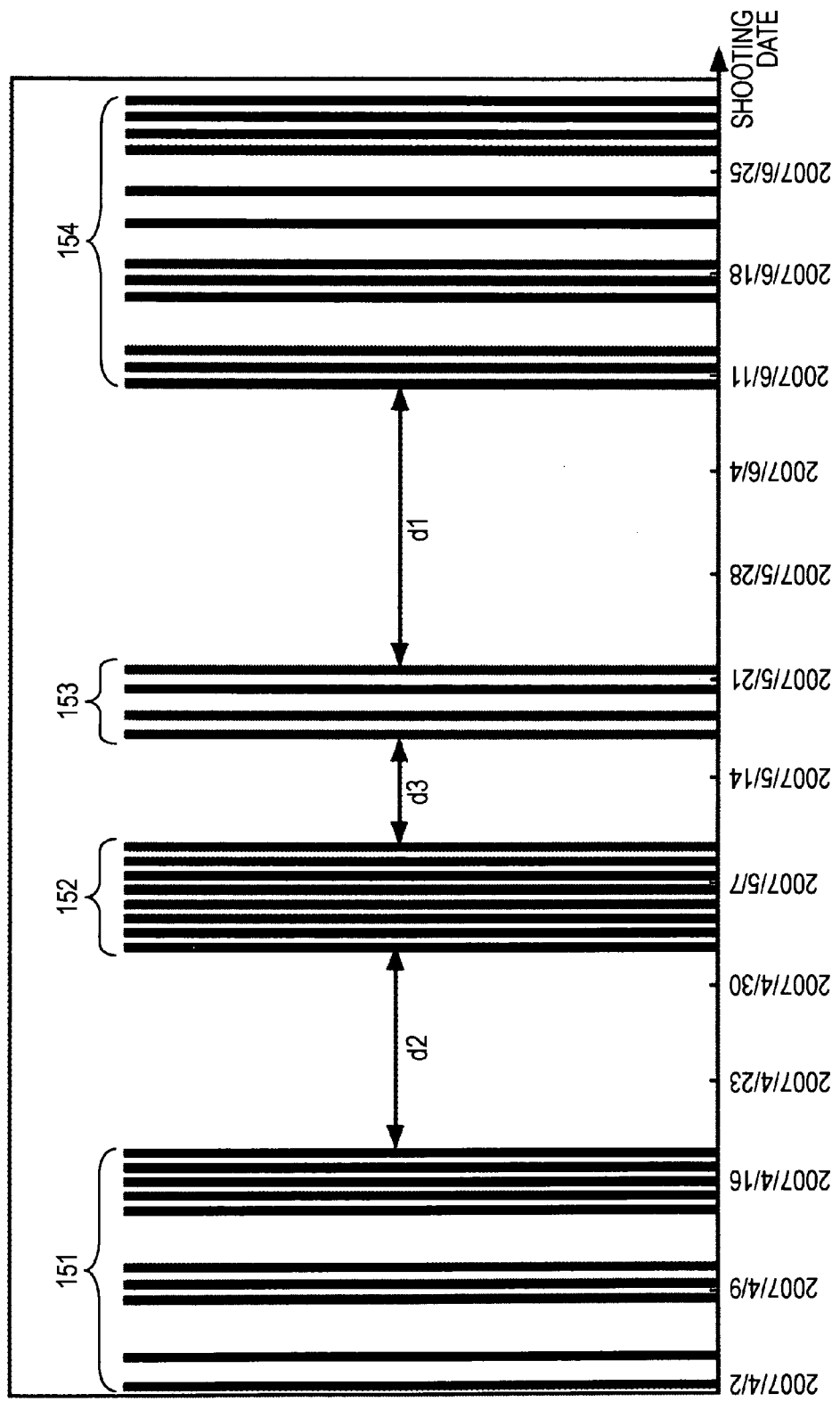
FIG. 3 is a graph of an example of distribution information.

FIG. 3 is a graph of an example of distribution information, and, in FIG. 3, the shooting dates of the images are plotted on the horizontal axis representing shooting dates. Referring to FIG. 3, vertical bars shown in FIG. 3 represent the metadata items of the images that have been output as the search results. The metadata items are information items showing the shooting dates of the images. For simplicity of description, only one image was shot on each date.

The classification-data-generating section 103 calculates distances between adjacent metadata items (in this case, adjacent vertical bars shown in FIG. 3) in the distribution information shown in FIG. 3. When the search results are classified into four groups, the classification-data-generating section 103 extracts three (=4−1) longer distances from among the distances between adjacent metadata items. In the example shown in FIG. 3, distances d1, d2, and d3 are extracted in decreasing order of distance.

Then, the classification-data-generating section 103 classifies adjacent metadata items having the distance d1 therebetween into different groups. The classification-data-generating section 103 classifies adjacent metadata items having the distance d2 therebetween into other different groups, and classifies adjacent metadata items having the distance d3 therebetween into a further other different groups. As a result, the metadata items (in this case, the shooting dates) are classified into four groups 151 to 154.

Figure 4:
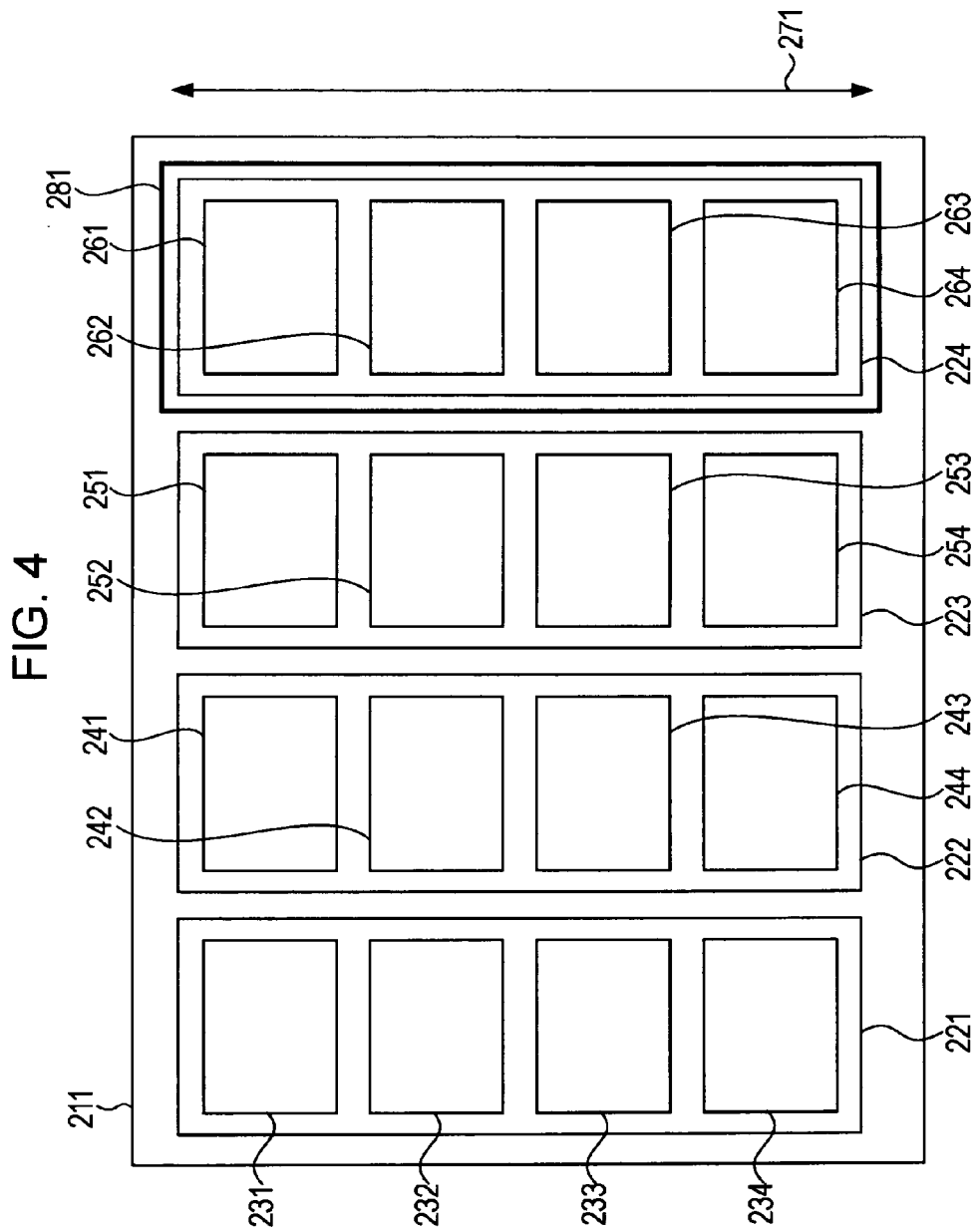
FIG. 4 is an illustration of an example of a display screen on which search results are displayed.

The display-data-generating section 104 generates display data used to display the images that were shot on the shooting dates, which have been classified into the four groups 151 to 154, in corresponding predetermined regions on the screen of the display 34, for example, as shown in FIG. 4.

In an example shown in FIG. 4, on a screen 211 of the display 34, the four regions 221 to 224 are provided. The region 221 is a region in which images that were shot on shooting dates (from Apr. 2, 2007 A.D. to Apr. 18, 2007 A.D.) which have been classified into the group 151 shown in FIG. 3 are displayed. Images 231 to 234 are four images from among ten images that were shot on the shooting dates which have been classified into the group 151.

Similarly, the region 222 is a region in which images that were shot on shooting dates which have been classified into the group 152 are displayed. Images 241 to 244 are four images from among images that were shot on the shooting dates which have been classified into the group 152. The region 223 is a region in which images that were shot on shooting dates which have been classified into the group 153 are displayed. Images 251 to 254 are four images from among images that were shot on the shooting dates which have been classified into the group 153. The region 224 is a region in which images that were shot on shooting dates which have been classified into the group 154 are displayed. Images 261 to 264 are four images from among images that were shot on the shooting dates which have been classified into the group 154.

In the four regions 221 to 224, for example, the displayed images can be scrolled in the vertical direction that is indicated by an arrow 271 in FIG. 4. For example, the user controls the operation unit of the controller 33, and, as a result, operation-input information is supplied from the operation-input-accepting section 105. On the basis of the operation-input information, images displayed in any of the regions 221 to 224 on the screen 211 are changed sequentially to different images. For example, when the user scrolls the images displayed in the region 224 in the upward direction of FIG. 4, the image 261 disappears from the region 224, and an image that is to be displayed after the image 264 is newly displayed in the region 224. When the user further scrolls the images, the image 262 disappears from the region 224, and an image that is to be displayed after the image 262 is newly displayed in the region 224. The images are displayed in the region 224 in such a manner.

A region that the user scrolls, for example, can be selected by moving a frame 281, which is displayed on the screen 211 as a graphical user interface (GUI), such that the frame 281 is overlaid on a desired region.

In this manner, even when a large number of images, which are obtained as search results, are displayed and a desired image (a target image) is not displayed on the screen 211, the user can intuitively know a region in which the target image is displayed by using the images displayed in the regions 221 to 224. The user can find the target image, for example, by scrolling the images in the regions.

However, for example, in a case in which there are a large number of search results, even when images that have been obtained as the search results are classified and displayed into the regions 221 to 224, it is difficult to find the target image for some cases.

For this reason, in this embodiment of the present invention, the images displayed in any of the regions 221 to 224 can be classified into a further four groups, and be displayed in the regions 221 and 224.

For example, in the region 224 shown in FIG. 4, twelve images that were shot on the shooting dates which have been classified into the group 154 shown in FIG. 3 are sequentially displayed by scrolling. When a predetermined operation is performed in a state in which the frame 281 is overlaid on the region 244, the images that were shot on the shooting dates classified into the group 154 are classified into a further four groups, and newly displayed in the regions 221 to 224 on the screen 211.

Figure 5:
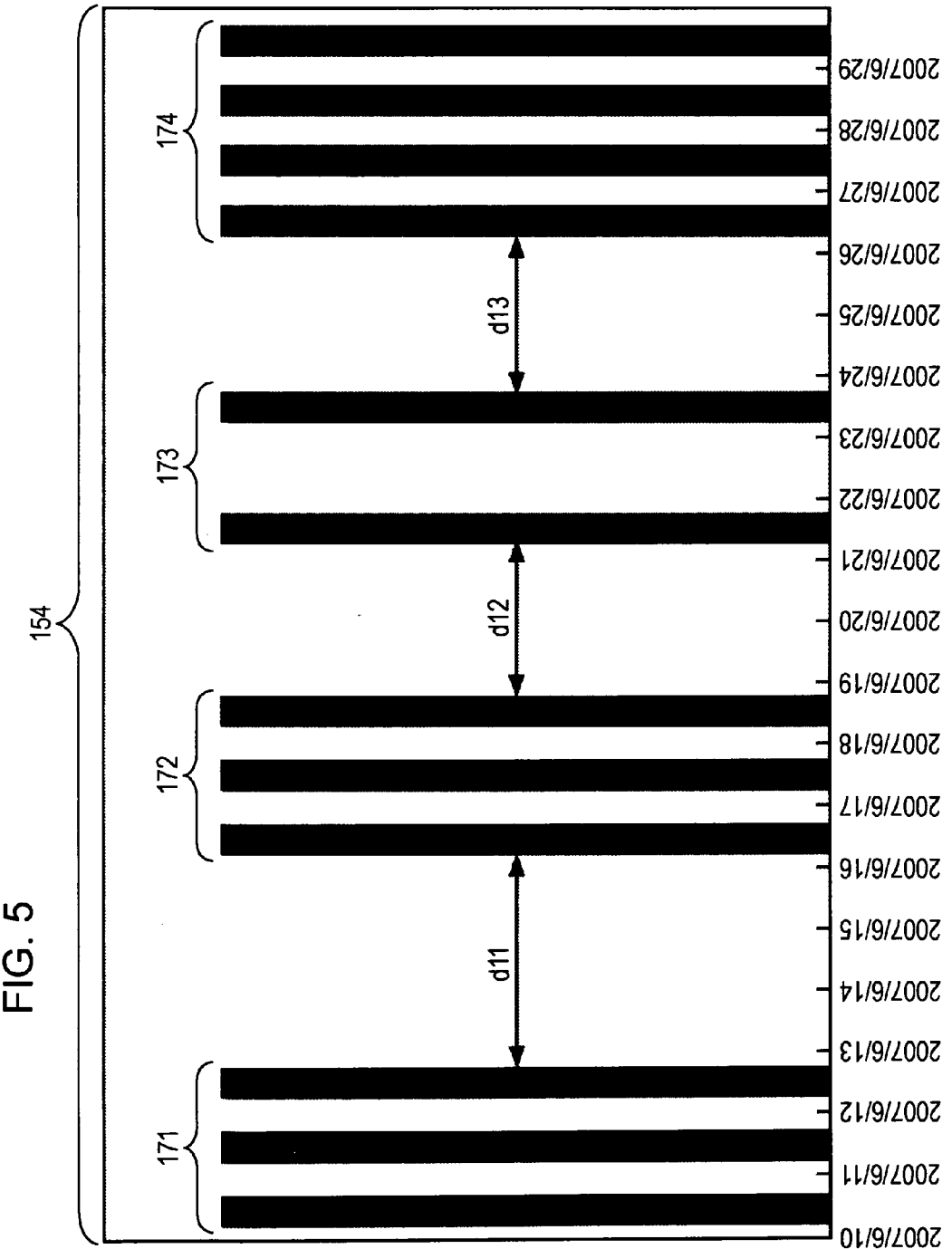
FIG. 5 is a graph of an example of distribution information that is generated using a one extracted portion of the distribution information shown in FIG. 3.

FIG. 5 is a graph in which the portion of the group 154 shown in FIG. 3 is enlarged. In FIG. 5, as in the case of FIG. 3, the shooting dates of images are plotted on the horizontal axis representing shooting dates to show distribution information. Vertical bars shown in FIG. 5 represent the shooting dates of images that have been output as search results.

For example, the user performs a predetermined operation in a state in which the frame 281 is overlaid on the region 224 on the screen 211 shown in FIG. 4. In this case, the operation-input-accepting section 105 supplies information corresponding to an instruction for further generating distribution information concerning the metadata items that have been classified into the group 154 to the search-result-analyzer section 102. The search-result-analyzer section 102 supplies distribution information shown in FIG. 5 to the classification-data-generating section 103.

In such a case, the classification-data-generating section 103 calculates distances between adjacent metadata items (in this case, vertical bars shown in FIG. 5) in the distribution information shown in FIG. 5. The classification-data-generating section 103 extracts three (=4−1) longer distances from among the distances between adjacent metadata items. As shown in FIG. 5, distances d11, d12, and d13 are extracted in decreasing order of distance.

Then, the classification-data-generating section 103 classifies adjacent metadata items having the distance d11 therebetween into different groups. The classification-data-generating section 103 classifies adjacent metadata items having the distance d12 therebetween into other different groups, and classifies adjacent metadata items having the distance d13 therebetween into a further other different groups. As a result, the metadata items of the group 154 (in this case, the shooting dates) is further classified into four groups 171 to 174.

The display-data-generating section 104 generates display data used to display images that were shot on the shooting dates classified into the four groups 171 to 174 respectively in the regions 221 to 224 on the screen 211 of the display 34. As a result, in this case, in the region 221, images that were shot on shooting dates (from Jun. 10, 2007 A.D. to Jun. 12, 2007 A.D.) which have been classified into the group 171 shown in FIG. 5 are displayed. In the region 222, images that were shot on shooting dates (from Jun. 16, 2007 A.D. to Jun. 18, 2007

A.D.) which have been classified into the group 172 shown in FIG. 5 are displayed. In the region 223, images that were shot on shooting dates (from Jun. 21, 2007 A.D. to Jun. 23, 2007 A.D.) which have been classified into the group 173 shown in FIG. 5 are displayed. In the region 224, images that were shot on shooting dates (from Jun. 26, 2007 A.D. to Jun. 29, 2007 A.D.) which have been classified into the group 174 shown in FIG. 5 are displayed.

In this manner, even when a large number of images are obtained as search results, the user can easily and quickly find a target image.

Figure 6:
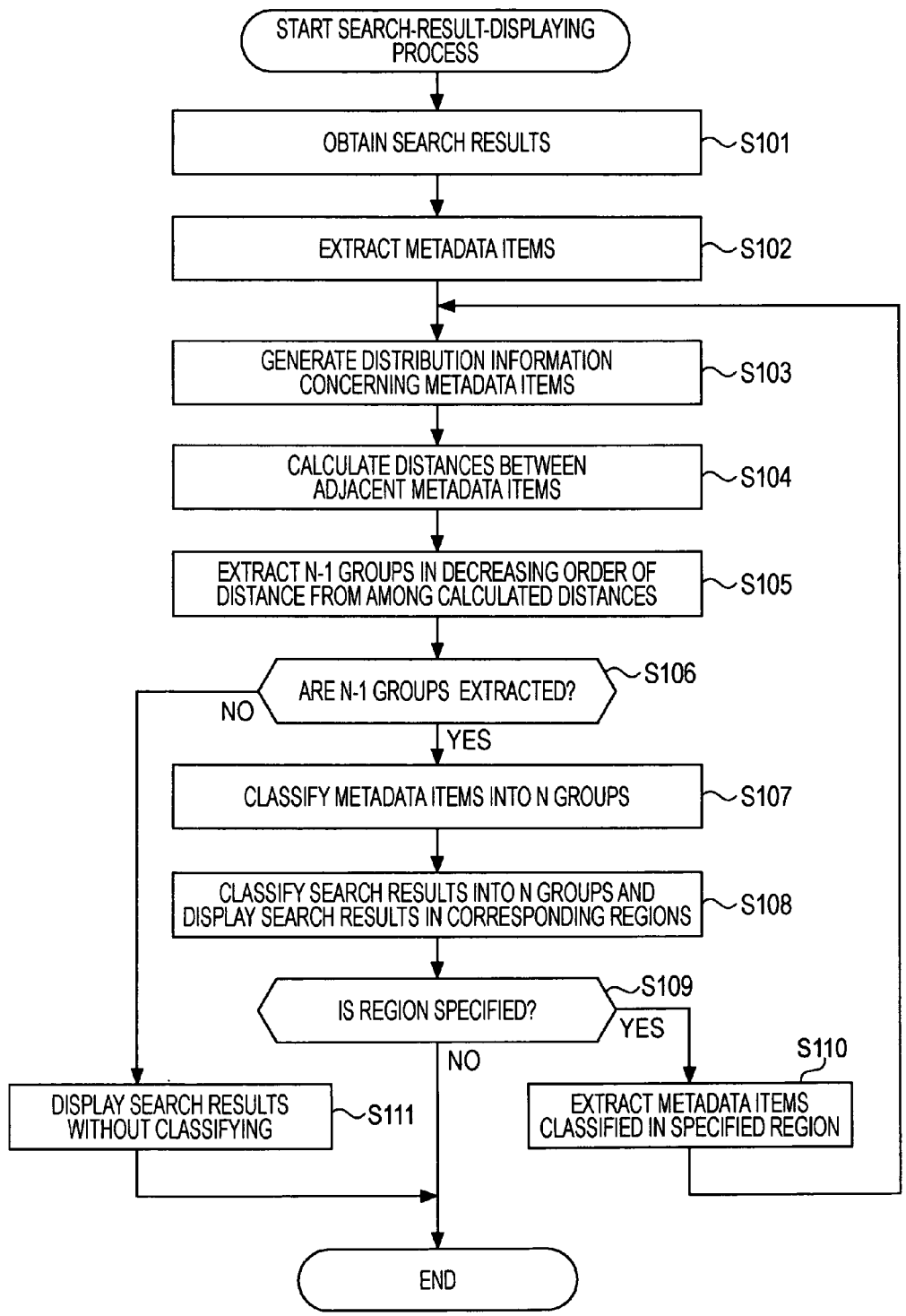
FIG. 6 is a flowchart describing an example of a search-result-displaying process.

Next, a search-result-displaying process performed by the search system 10 according to an embodiment of the present invention will be described with reference to a flowchart shown in FIG. 6. The search-result-displaying process is performed, for example, when the user controls the operation unit of the controller 33 or the like to provide an instruction for searching data items. In this case, in the database 31, for example, image data items that were shot by a digital still camera or the like are accumulated. An example will be described, in which the user inputs shooting dates (for example, from "2007/4/1", to "2007/6/30") included in a predetermined period and provides an instruction for searching images.

In step S101, the search-result-obtaining section 101 obtains search results of a search process performed by the search processor 32. In this example, images that were shot in the period from Apr. 1, 2007 A.D. to Jun. 30, 2007 A.D. are obtained as the search results from among the image data items accumulated in the database 31.

In step S102, the metadata-extracting unit 121 of the search-result-analyzer section 102 extracts metadata items corresponding to the search results, which have been obtained in the process of step S101. In this example, information items showing the shooting dates of images are extracted as the metadata items.

In step S103, the distribution-generating unit 122 of the search-result-analyzer section 102 generates distribution information concerning the metadata items. In this example, for example, distribution information shown in FIG. 3 is generated.

In step S104, the classification-data-generating section 103 calculates distances between adjacent metadata items in the distribution information, which has been generated in the process of step S103, to obtain calculated lengths. In step S105, (N−1) distances are extracted from among the calculated distances in decreasing order of distance. N is the number of regions (for example, the regions 221 to 224 shown in FIG. 4) on the screen, which are displayed by the display 34. For example, the equation N=4 can be obtained.

In step S106, the classification-data-generating section 103 determines whether or not (N−1) distances are extracted from among the calculated distances in decreasing order of distance. When it is determined that (N−1) distances are extracted, the process proceeds to step S107.

In step S107, the classification-data-generating section 103 classifies the metadata items into N groups. In this example, the metadata items are classified into, for example, the groups 151 to 154 shown in FIG. 3.

In step S108, the display-data-generating section 104 generates display data used to display the search results (in this case, the image data items) corresponding to the metadata items (in this case, the shooting dates), which have been classified into the groups 151 to 154 shown in FIG. 3, in corresponding regions on the screen of the display 34. In this step, for example, as described above with reference to FIG. 4, in the region 221, images that were shot on shooting dates which have been classified into the group 151 shown in FIG. 3 are displayed, . . . , and, in the region 224 images that were shot on shooting dates which have been classified into the group 154 are displayed.

In step S109, the search-result-analyzer section 102 determines whether or not a region having data items that are to be re-classified is specified. For example, the user performs a predetermined operation in a state in which the frame 281 is overlaid on a predetermined region (for example, the region 224) on the screen 211 shown in FIG. 4. In this case, in step S109, it is determined that a region having data items that are to be re-classified is specified. The process proceeds to step S110.

In step S110, the metadata-extracting unit 121 of the search-result-analyzer section 102 extracts metadata items that have been classified into a group corresponding to the specified region. The process returns to step S103.

In step S103, the distribution-generating unit 122 of the search-result-analyzer section 102 generates distribution information concerning the metadata items, which have been extracted in the process of step S110. In this step, for example, distribution information shown in FIG. 5 is generated.

Then, the processes of steps S104 to S107 are performed by the classification-data-generating section 103. In the process of step S108, new display data is generated. In this example, in the process of step S108, in the region 221, images that were shot on shooting dates which have been classified into the group 171 shown in FIG. 5 are displayed, . . . , and, in the region 224, images that were shot on shooting dates which have been classified into the group 174 are displayed. In this manner, the display data is generated.

As described above, in step S109, every time it is determined that a region having data items that are to be re-classified is specified, the process of step S110 and the process of steps S103 to S108 are repeatedly performed.

In contrast, in step S106, when it is determined that (N−1) distances are not extracted, the process proceeds to step S111. For example, when the number of search results supplied from the search processor 32 is less than N, or when the number of images to be displayed in predetermined regions is less than N as a result of the repetition of performance of the process of step S110 and the process of steps S103 to S108, it may be impossible to extract (N−1) distances. Additionally, the number of images to be displayed as the search results is sufficiently small.

In step S111, the display-data-generating section 104 generates display data used to display images obtained as the search results without classifying. In this step, for example, display data is generated such that the images obtained as the search results are displayed on the screen of the display 34 without providing the regions 221 to 224.

After the process of step S111 is performed, or when it is determined that no region having data items that are to be re-classified is specified in step S109, the search-result-displaying process is finished.

In this manner, the search results are displayed.

An example has been described above, in which one-dimensional distribution information, such as the distribution information shown in FIG. 3, is generated by the distribution-generating unit 122 of the search-result-analyzer section 102. However, for example, when a plurality of additional information items that are attached to data items obtained as search results are extracted as metadata items by the metadata-extracting unit 121 of the search-result-analyzer section 102, two-or-more-dimensional distribution information is generated as the distribution information generated by the distribution-generating unit 122.

Figure 7:
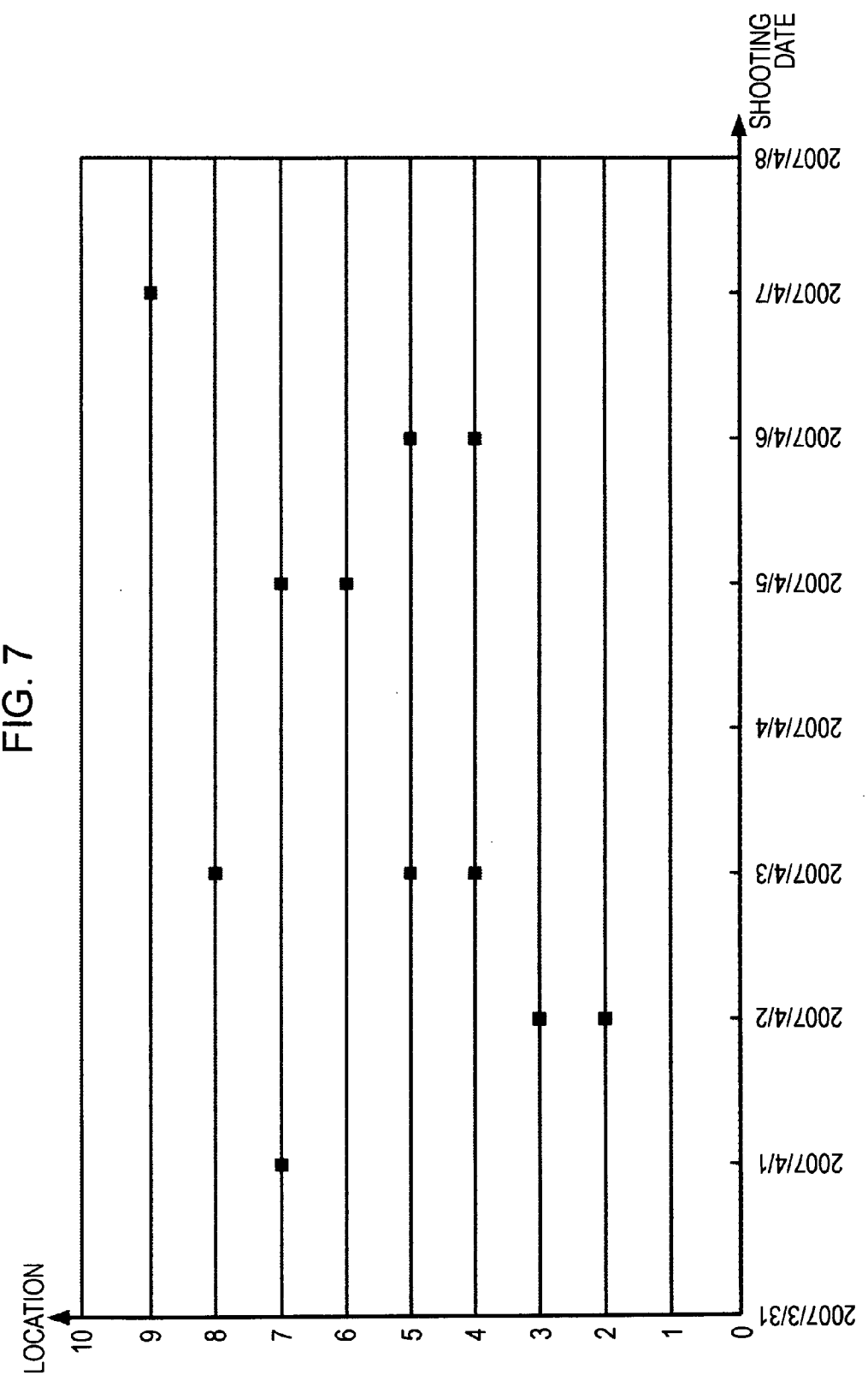
FIG. 7 is a graph of an example of two-dimensional distribution information.

For example, when information items concerning shooting dates and information items concerning shooting locations are attached to the image data items accumulated in the database 31, distribution information shown as FIG. 7 is generated by the distribution-generating unit 122 of the search-result-analyzer section 102.

FIG. 7 shows an example of two-dimensional distribution information, in which shooting dates and shooting locations of images obtained as search results are plotted. In FIG. 7, the horizontal axis represents shooting dates, and the vertical axis represents values showing locations. The shooting locations are digitized, for example, as information items showing distances from a reference location to the shooting locations. In FIG. 7, squares shown in FIG. 7 represent metadata items of images output as search results.

When distribution information such as the distribution information shown in FIG. 7 is generated, the distribution-generating unit 122 re-analyzes the distribution information that has been obtained, for example, using multivariate analysis, such as principal component analysis (PCA), to generate one-dimensional distribution information. Then, the one-dimensional distribution information is supplied to the classification-data-generating section 103.

Because one dimensional distribution information can be generated from two-dimensional distribution information, the embodiment of the present invention can be applied to a case in which search results that a plurality of information items are attached to are to be displayed.

As a screen displayed on the display 34 to show search results, for example, a screen shown in FIG. 8 can be used instead of the screen used in the example described above with reference to FIG. 4.

FIG. 8 is an illustration of another example of the display screen on which search results are displayed. In FIG. 8, no regions corresponding to the regions 221 to 224 shown in FIG. 4 are provided on a screen 311. Additionally, in FIG. 4, the images are displayed so as to be arranged in the vertical direction of FIG. 4. In contrast, in the example shown in FIG. 8, the positions of images 321 to 352 are not aligned in the horizontal direction of FIG. 8. In a case shown in FIG. 8, by a scrolling operation, each of the images 321 to 352 can be scrolled and displayed in the vertical direction, which is indicated by an arrow 371, of FIG. 8.

In FIG. 8, for example, the positions of the images 321 to 352 in the horizontal direction of FIG. 8 are defined in correspondence with the shooting dates of the images. For example, when display data used to display the screen 311 is generated, metadata items (for example, shooting dates) attached in advance to images obtained as search results are extracted, and distribution information concerning the metadata items is generated. Then, on the basis of the distribution information, the metadata items are classified. The shooting dates of the images 321 to 324 are classified into a first group. The shooting dates of the images 331 to 333 are classified into a second group. The shooting dates of the images 341 to 343 are classified into a third group. The shooting dates of the images 351 to 352 are classified into a fourth group.

In a display method that has been described above with reference to FIG. 4, the images 321 to 324 are displayed in the region 221. The images 331 to 333 are displayed in the region 222. The images 341 to 343 are displayed in the region 223. The images 351 to 352 are displayed in the region 224. However, in the example shown in FIG. 8, the positions of the images 321 to 352 in the horizontal direction of FIG. 8 are defined in accordance with the shooting dates of the images 321 to 352.

FIG. 9 is an enlarged illustration of a peripheral portion of the images 351 and 352 shown in FIG. 8. As shown in FIG. 9, a position of a line segment L21 passing through the center of the image 351, which is a line segment extending in the vertical direction of FIG. 9 (of the screen), in the horizontal direction, and a position of a line segment L22 passing through the center of the image 352, which is a line segment extending in the vertical direction, in the horizontal direction are defined in correspondence with shooting dates. In an example shown in FIG. 9, the position of the line segment L21 in the horizontal direction corresponds to a shooting date "2007/4/1", and the position of the line segment L22 in the horizontal direction corresponds to a shooting date "2007/4/5". In other words, the image 351 is an image that was shot on Apr. 1, 2007 A.D., and the image 352 is an image that was shot on Apr. 5, 2007 A.D.

The position in the vertical direction at which each image is displayed can be appropriately set such that the image is displayed at a position at which is easy for the user to see the image. For example, the position in the vertical direction at which each image is displayed can be calculated and set on the basis of distances in the horizontal direction between peripheral images, which are adjacent to the image, and the image using predetermined criteria.

By displaying images in this manner, the user can intuitively recognize how close the shooting dates of images are to one another. Accordingly, the user can more quickly find a target image. For example, in the example shown in FIG. 9, a distance d21 between the line segments L21 and L22 represents a period from a date on which the image 351 was shot to a data on which the image 352 was shot. With such an arrangement of the images, the user can intuitively recognize how close the shooting dates of images are to each other.

Additionally, also in the case of FIG. 8, for example, a GUI similar to a GUI using the frame 281 shown in FIG. 4 or the like is displayed, and by specifying a region using the GUI, only images in the region may be displayed. For example, when a region in which the images 343, 351, and 352 are disposed is specified, a manner in which the images are displayed may be changed so that the shooting date of the image 343 can be positioned at the left end on the horizontal axis of the screen, and so that the shooting date of the image 352 can be positioned at the right end on the horizontal axis of the screen. In other words, the user can specify a region so that only images that were shot on shooting dates included in a predetermined period can be displayed.

An example has been described above, in which shooting dates of images are used as metadata items. Furthermore, for example, other information items such as information items concerning persons that are identified as objects by face-image identification or the like can be used as metadata items, and search results can also be displayed using other information items as in the above-described case.

Additionally, evaluation values that are calculated by the search processor 32 can be used as metadata items, and search results can be displayed using the evaluation values as in the above-described case.

An example has been described above, in which image data items are searched by the search system 10 to obtain search results and in which the search results are displayed. Furthermore, the embodiment of the present invention can also be applied to a case in which other information items are searched to obtain search results and in which the search results are displayed.

In addition, an example has been described above, in which search results that are searched by the search system 10 are displayed. Furthermore, the embodiment of the present invention can also be applied to a case in which no search operation is performed.

For example, a display system 20 shown in FIG. 10 is different from the search system 10 shown in FIG. 1 in that the display system 20 does not include the search processor 32. The configuration of the display system 20 shown in FIG. 10 is the same as that of the search system 10 shown in FIG. 1 except for the search processor 32. Referring to FIG. 10, for example, when the controller 33 is designed so as to obtain image data items directly from the database 31 without searching and to perform the processes described above with reference to FIG. 6, images can be displayed in the display methods described above with reference to FIGS. 4 and 8.

As described above, the embodiment of the present invention can also be applied to the display system 20 in which no search operation is performed, and in which the accumulated data items are displayed.

The above-described series of the processes can be performed by hardware, and can also be performed by software. When the above-described series of the processes is performed by software, a program configured as the software is installed via a network or from a recording medium into a computer built in dedicated hardware, or into a general-purpose personal computer 700 into which various types of programs are installed so that various types of functions can be performed, for example, and which is shown in FIG. 11.

Figure 11:
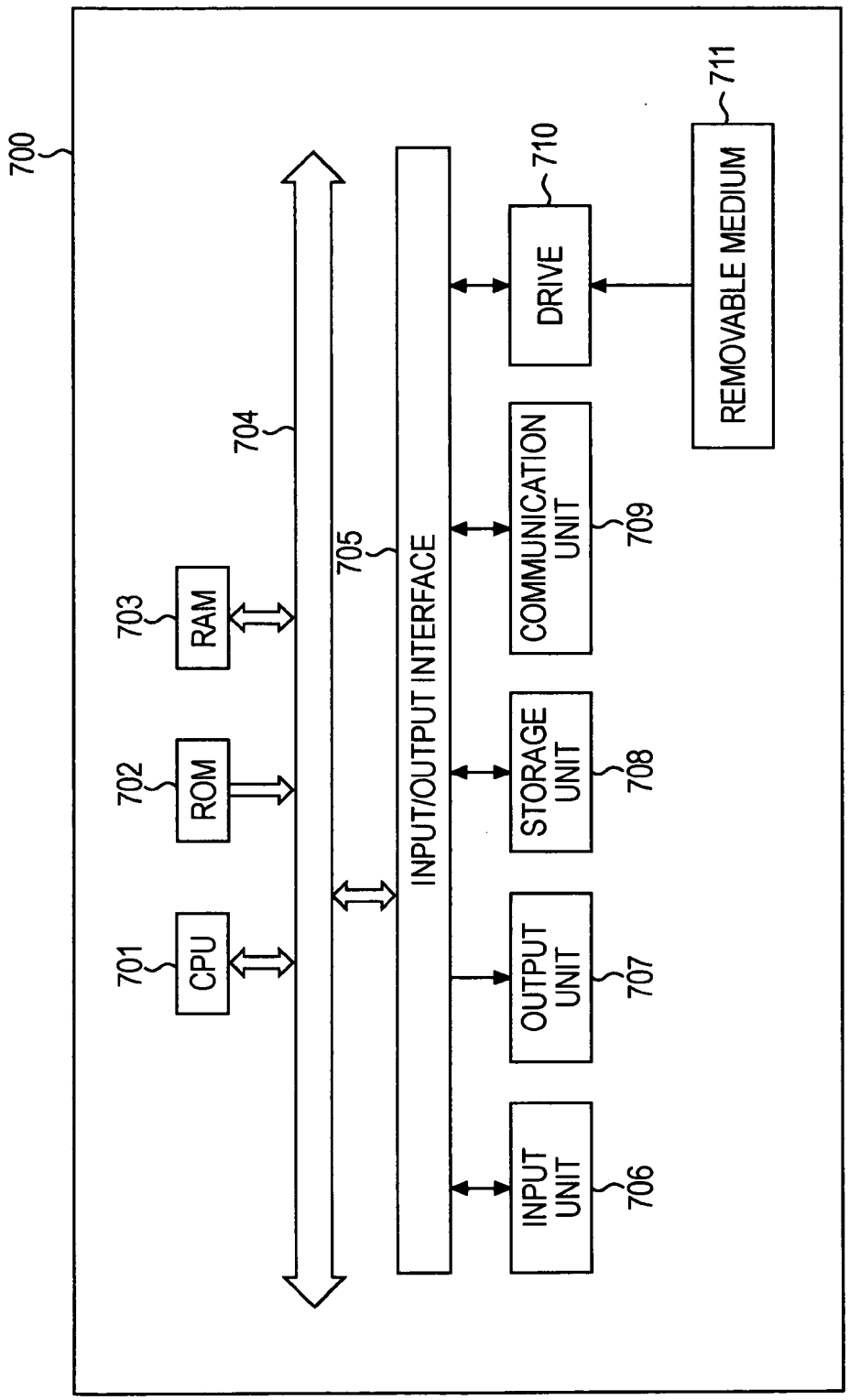
FIG. 11 is a block diagram of an example of a configuration of a personal computer.

Referring to FIG. 11, a central processing unit (CPU) 701 performs various types of processes in accordance with a program stored in a read-only memory (ROM) 702, or a program loaded from a storage unit 708 into a random-access memory (RAM) 703. In the RAM 703, for example, data that is necessary in a case in which the CPU 701 performs the various types of processes is appropriately stored.

The CPU 701, the ROM 702, and the RAM 703 are connected to one another via a bus 704. To the bus 704, an input/output interface 705 is also connected.

To the input/output interface 705, an input unit 706 including a keyboard and a mouse, an output unit 707 including a display such as a cathode ray tube (CRT) display or a liquid crystal display (LCD) and a speaker, the storage unit 708 including a hard disk, and a communication unit 709 including a network interface card, such as a local area network (LAN) card, are connected. The communication unit 709 performs a communication process via a network including the Internet.

To the input/output interface 705, a drive 710 is connected if necessary. A removable medium 711, such as a magnetic disk, an optical disk, a magneto-optical disk, or a semiconductor memory, is appropriately mounted to the drive 710. A computer program that is read from the removable medium 711 is installed into the storage unit 708 if necessary.

When the above-described series of the processes is performed by software, a program configured as the software is installed via a network such as the Internet, or from a recording medium configured using the removable medium 711 or the like.

Not only the recording medium be a recording medium configured using the removable medium 711 which is shown in FIG. 11, which is distributed separately from a body of an apparatus in order to distribute a program to a user, and in which the program is recorded. Examples of the removable medium 711 include a magnetic disk (such as a floppy disk), an optical disk (such as compact disk-read only memory (CD-ROM) or a digital versatile disk (DVD)), a magneto-optical disk (such as a mini-disk (MD)™), and a semiconductor memory. The recording medium may also be a recording medium configured using the ROM 702 or a hard disk included in the storage unit 708. The ROM 702 or the hard disk is built in a body of an apparatus in advance, and, in the ROM 702 or the hard disk, a program that is distributed to a user is recorded.

The steps in which the above-described series of processes is performed in the embodiment of the present invention include processes that are sequentially performed in an order in which the processes are described. The steps also include processes that are performed in parallel or are individually performed, which are not necessarily sequentially performed.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus for displaying accumulated data items on a display unit, the display apparatus comprising:
a processor for controlling
a search-result-obtaining section for obtaining a plurality of data items that are accumulated, the data items including information items concerning persons that are identified as objects by face-image identification;
a search-result-analyzer section for digitizing the plurality of data items to generate a two-or-more-dimensional distribution and converting the two-or-more-dimensional distribution into a one-dimensional distribution;
a classification-data-generating section for classifying the plurality of data items that are obtained by the search-result-obtaining section into N groups on the basis of the one-dimensional distribution and predetermined criteria;
a display-data-generating section for controlling an indication on the display unit such that the plurality of data items that are classified by the classification-data-generating section are displayed in N display regions corresponding to the N groups; and
an operation-input-accepting section for accepting a specification of one display region from among the N display regions,
wherein, when the operation-input-accepting section accepts a specification of one display region from among the N display regions, the classification-data-generating section classifies a plurality of data items displayed in the specified display region into a further N groups, and the display-data-generating section controls an indication on the display unit such that the plurality of data items that are further classified by the classification-data-generating section are newly displayed in the N display regions corresponding to the N groups,
wherein each of the N display regions is scrollable, and wherein specification of one display region from among the N display regions is generated when (i) a frame is displayed about the one display region, at a time when all N display regions are displayed, such that the frame does not change the appearance of the one display region and (ii) a predetermined operation is performed while the frame is displayed about the one display region, and
wherein when one of the N scrollable display regions is specified, the plurality of items displayed in the specified display region are displayed among a new set of N scrollable display regions.

2. The display apparatus according to claim 1, wherein, in each of the N display regions, a predetermined number of data items from among data items that are classified into a group corresponding to the display region are displayed.

3. The display apparatus according to claim 1, wherein the classification-data-generating section generates information showing a distribution of the plurality of data items on the basis of additional data items that are attached in advance to the plurality of data items obtained by the search-result-obtaining section, and calculates distances between the plurality of data items in the distribution to classify the plurality of data items into the N groups.

4. The display apparatus according to claim 1, wherein the classification-data-generating section generates information showing a distribution of the plurality of data items on the basis of evaluation values on the plurality of data items, the evaluation values being calculated by another apparatus, and calculates distances between the plurality of data items in the distribution to classify the plurality of data items into the N groups.

5. The display apparatus according to claim 1, wherein, on a screen of the display unit on which the indication is controlled by the display-data-generating section, each of the N display regions has a predetermined size and is provided at a predetermined position.

6. The display apparatus according to claim 1, wherein on a screen on which the indication is controlled by the display-data-generating section, the N display regions are set in correspondence with the plurality of data items.

7. A display method for a display apparatus that displays accumulated data items on a display unit, the display method comprising the steps of:
   obtaining a plurality of data items that are accumulated, the data items including information items concerning persons that are identified as objects by face-image identification;
   digitizing the plurality of data items to generate a two-or-more-dimensional distribution and converting the two-or-more-dimensional distribution into a one-dimensional distribution;
   classifying the plurality of data items that are obtained into N groups on the basis of the one-dimensional distribution and predetermined criteria;
   controlling an indication on the display unit such that the plurality of data items that are classified are displayed in N display regions corresponding to the N groups;
   classifying, in a case in which a specification of one display region from among the N display regions is accepted, a plurality of data items displayed in the specified display region into a further N groups; and
   controlling an indication on the display unit such that the plurality of data items that are further classified are newly displayed in the N display regions corresponding to the N groups,
   wherein each of the N display regions is scrollable, and wherein specification of one display region from among the N display regions is generated when (i) a frame is displayed about the one display region, at a time when all N display regions are displayed, such that the frame does not change the appearance of the one display region and (ii) a predetermined operation is performed while the frame is displayed about the one display region, and
   wherein when one of the N scrollable display regions is specified, the plurality of items displayed in the specified display region are displayed among a new set of N scrollable display regions.

8. A non-transitory computer-readable medium storing a computer-readable program for causing a computer to perform a process of displaying accumulated data items on a display unit, the program causing the computer to function as:
   a display apparatus for displaying accumulated data items on the display unit, the display apparatus including
   a search-result-obtaining section for obtaining a plurality of data items that are accumulated, the data items including information items concerning persons that are identified as objects by face-image identification;
   a search-result-analyzer section for digitizing the plurality of data items to generate a two-or-more-dimensional distribution and converting the two-or-more-dimensional distribution into a one-dimensional distribution;
   a classification-data-generating section for classifying the plurality of data items that are obtained by the search-result-obtaining section into N groups on the basis of the one-dimensional distribution and predetermined criteria;
   a display-data-generating section for controlling an indication on the display unit such that the plurality of data items that are classified by the classification-data-generating section are displayed in N display regions corresponding to the N groups; and
   an operation-input-accepting section for accepting a specification of one display region from among the N display regions,
   wherein, when the operation-input-accepting section accepts a specification of one display region from among the N display regions, the classification-data-generating section classifies a plurality of data items displayed in the specified display region into a further N groups, and the display-data-generating section controls an indication on the display unit such that the plurality of data items that are further classified by the classification-data-generating section are newly displayed in the N display regions corresponding to the N groups,
   wherein each of the N display regions is scrollable, and wherein specification of one display region from among the N display regions is generated when (i) a frame is displayed about the one display region, at a time when all N display regions are displayed, such that the frame does not change the appearance of the one display region and (ii) a predetermined operation is performed while the frame is displayed about the one display region, and
   wherein when one of the N scrollable display regions is specified, the plurality of items displayed in the specified display region are displayed among a new set of N scrollable display regions.

* * * * *